(12) United States Patent
Matsuoka et al.

(10) Patent No.: US 6,168,124 B1
(45) Date of Patent: Jan. 2, 2001

(54) IMAGE RECEIVING MONITOR USING LCD

(75) Inventors: Yoshiaki Matsuoka; Hajime Sekino; Toshio Ikeuchi, all of Tottori (JP)

(73) Assignees: Sanyo Electric Co., Ltd., Moriguchi; Tottori Sanyo Electric Co., Ltd., Tottori, both of (JP)

( * ) Notice: Under 35 U.S.C. 154(b), the term of this patent shall be extended for 0 days.

(21) Appl. No.: 09/212,379

(22) Filed: Dec. 16, 1998

(30) Foreign Application Priority Data

Dec. 18, 1997 (JP) .................................................... 9-349126

(51) Int. Cl.⁷ .................................................... F16M 11/00
(52) U.S. Cl. ........................ 248/176.1; 248/923; 361/681
(58) Field of Search ............................. 248/176.1, 125.9, 248/397, 291.1, 184.1, 176.3, 919, 920, 921, 922, 923; 361/681, 682

(56) References Cited

U.S. PATENT DOCUMENTS

| | | | |
|---|---|---|---|
| 4,395,010 | * 7/1983 | Helgeland et al. | 248/371 |
| 5,016,849 | * 5/1991 | Wu | 248/183 |
| 5,812,368 | * 9/1998 | Chen et al. | 361/681 |
| 5,947,440 | * 9/1999 | Cho | 248/923 |
| 6,018,847 | * 2/2000 | Lu | 16/337 |

* cited by examiner

Primary Examiner—Anita M. King
(74) Attorney, Agent, or Firm—Arent Fox Kintner Plotkin Kahn, PLC

(57) ABSTRACT

Disclosed is an image receiving monitor using a liquid crystal display constructed by attaching a liquid crystal display panel (1) to a stand (2), in which the stand (2) includes a pedestal (3), a surface plate (4) in a semi-cylindrical shape provided on the pedestal (3), a cover (6) attached to the surface plate (4) so as to be detachable and constituting a space (5) in an approximately cylindrical shape together with the surface plate (4) when the cover is attached to the surface plate (4), and a hinge (10) fixed to the upper part of the base (7) and having one end projecting outward from the space (5), and the liquid crystal display panel (1) is attached to the one end of the hinge (10) so as to be detachable.

12 Claims, 2 Drawing Sheets

IMAGE RECEIVING MONITOR USING LCD

BACKGROUND OF THE INVENTION

1. Field of the Invention

The present invention relates to an image receiving monitor using an LCD which is suitable for use in a personal computer or the like.

2. Description of the Prior Art

An image receiving monitor using an LCD (Liquid Crystal Display) (hereinafter referred to as an LCD monitor) is smaller in size, is more lightweight, and is lower in power consumption, as compared with an image receiving monitor using a CRT (Cathode Ray Tube) (hereinafter referred to as a CRT monitor). Therefore, the LCD monitor has been paid attention to as an alternative to the current CRT monitor or an optional display device in a notebook-sized personal computer or the like.

An LCD monitor being currently marketed is one obtained by merely replacing a display of a conventional CRT monitor with an LCD panel. Therefore, it cannot be said that the LCD monitor sufficiently makes use of its original features.

SUMMARY OF THE INVENTION

The present invention has been made in view of such problems, and has for its object to make it possible to sufficiently extract the original features of an LCD monitor.

The present invention is directed to an image receiving monitor using an LCD constructed by attaching an LCD panel to a stand, characterized in that the stand comprises a pedestal, a surface plate in a semi-cylindrical shape provided on the pedestal, a cover attached to the surface plate so as to be detachable and constituting a space in an approximately cylindrical shape together with the surface plate when it is attached to the surface plate, and a hinge arranged in the space and having its one end projecting outward from the space, and the LCD panel is attached to the one end of the hinge so as to be detachable.

According to the above-mentioned construction, a desired LCD panel can be easily replaced.

The image receiving monitor can be so constructed that a base is provided on the pedestal in the space, and the hinge is provided on the upper part of the base.

The image receiving monitor can be so constructed that the cover has a roof covering a part of the upper part of the space when it is attached to the surface plate, and the roof is in the shape of a concentric circle whose center is a rotation axis of the hinge.

As described in the foregoing, the shape of the roof is the shape of a concentric circle whose center is the rotation axis of the hinge. Even when the LCD panel is also rotated as the movable portion of the hinge is rotated, therefore, the LCD panel can be smoothly rotated without being prevented its rotation by the roof. Further, the effect of preventing exposure is not lost.

An opening can be formed in the lower part of the cover.

A power supply line and a signal line are led out of the space through the opening, so that the aesthetic appearance of the power supply line and the signal line is improved.

The image receiving monitor may be so constructed that a signal line for supplying a signal to the LCD panel is connected to the LCD panel in a vertical direction from below the space.

By the above-mentioned construction, even when the LCD panel is also rotated as the movable portion of the hinge is rotated, the signal line does not prevent the hinge from being rotated.

The hinge can be constituted by a fixed portion fixed to the base, a movable portion to which the LCD panel is attached, and a fastener for attaching the fixed portion and the movable portion so as to be rotatable.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described in accordance with the drawings.

An LCD monitor in the present embodiment comprises an LCD panel 1 and a stand 2. The LCD panel 1 is attached to the stand 2, as described later.

Figure 2:
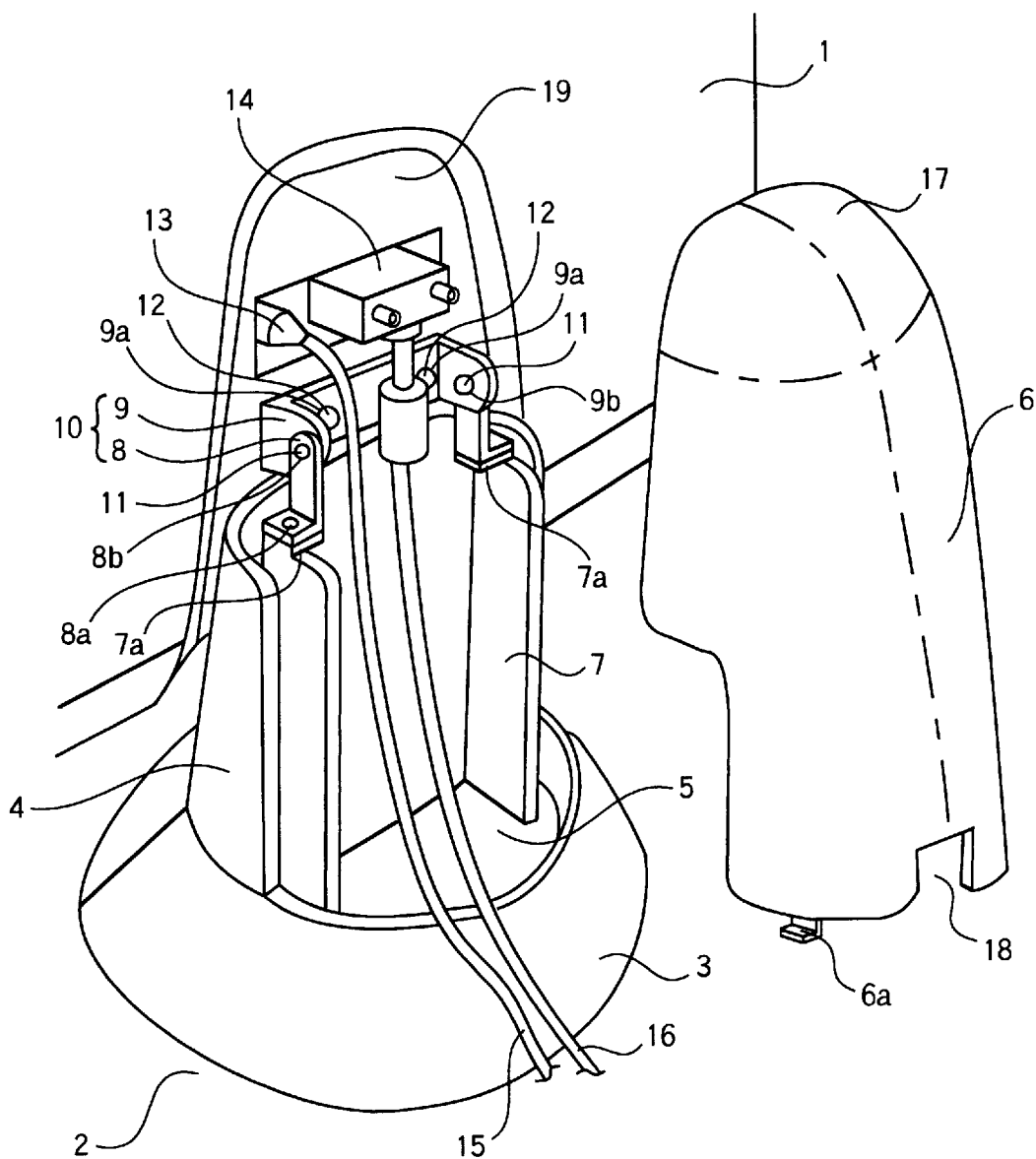
FIG. 2 is an exploded perspective view of a principal part of the embodiment of the present invention.

As shown in FIG. 2, the stand 2 comprises a pedestal 3 in an approximately circular truncated conical shape, and a surface plate 4 in a semi-cylindrical shape is provided on a front surface of the pedestal 3. There is provided a cover 6 made of resin which is attached to the surface plate 4 so as to be detachable. When a claw 6a below the cover 6 is engaged with the pedestal 3, to attach the cover 6 to the surface plate 4, the cover 6 and the surface plate 4 constitute a space 5 in an approximately cylindrical shape. A base 7 is provided on the pedestal 3 in the space. The pedestal 3, the surface plate 4, and the base 7 are integrally formed of resin.

A fixed portion 7a is provided on the upper part of the base 7, and an L-shaped fixture 8 made of a metal is attached and fixed to the fixed portion 7a by a fixing screw 8a.

The fixture 8 is provided with a hole 8b into which a bolt is to be inserted. A movable portion 9 made of a metal is attached to the fixture 8 so as to be rotatable by a fastener 11 composed of a bolt and a nut. That is, a hole 9b of the movable portion 9 and a hole 8b of the fixture 8 are overlapped with each other with a washer composed of a spring member interposed between the fixture 8 and the movable portion 9, to fix both the holes by the fastener 11. The movable portion 9 fixed to the fixture 8 projects outward from the space 5. The fixture 8, the movable portion 9, and the fastener 11 constitute a hinge 10. The movable portion 9 is rotated around an axis of the fixtures 8 extending in a horizontal direction in FIG. 1.

On the other hand, the LCD panel 1 is attached so as to be detachable by a screw 12 or the like through the hole 9a of the movable portion 9 in the hinge 10 on its rear surface. A screw hole (not shown) to be engaged with the screw 12 or the like is provided on the rear surface of the LCD panel 1. The hinge 10 holds the LCD panel 1 at a predetermined angle at the time of attaching the LCD panel 1 by a fastening force of the fastener 11. When a user rotates the LCD panel 1, the LCD panel 1 is rotatable upward and downward by the hinge 10.

A power supply connector 13 and an RGB (Red-Green-Blue) signal input connector 14 in the LCD panel 1 are arranged in the vicinity of and above the screw hole on the rear surface of the LCD panel 1. A power supply line 15 and a signal line 16 are respectively guided in a vertical direction from below toward the power supply connector 13 and the signal input connector 14 and are connected thereto. Even when the LCD display panel 1 is also rotated as the movable portion 9 of the hinge 10 is rotated, therefore, the power supply line 15 and the signal line 16 which are connected to the connectors 13 and 14 do not prevent the hinge 10 from being rotated.

Figure 1:
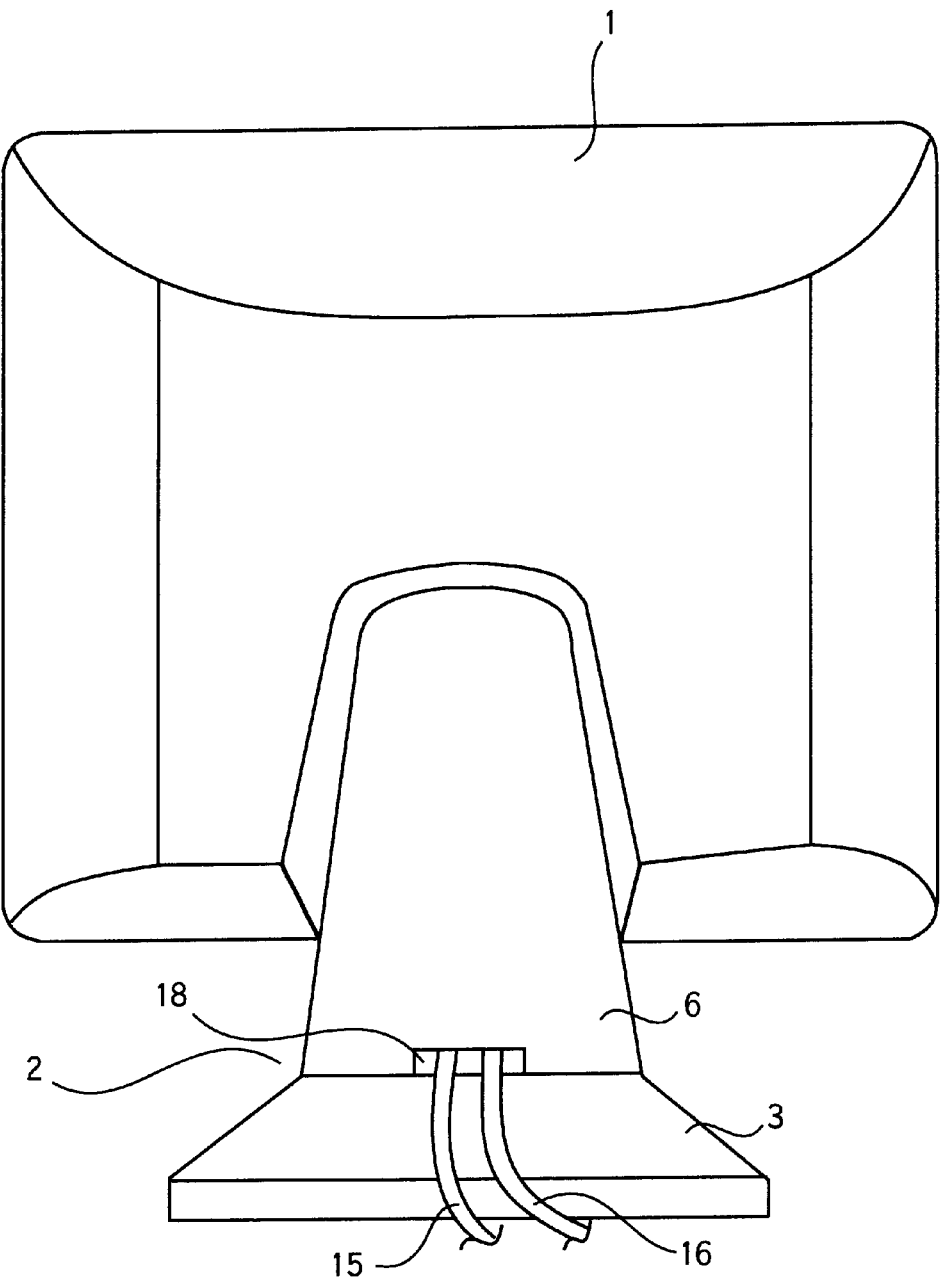
FIG. 1 is a rear view showing an embodiment of an LCD monitor to which the present invention is applied.

The cover 6 has a roof 17 covering a part of the upper part of the space 5 when it is attached to the surface plate 4. When the cover 6 is attached, therefore, it is possible to prevent the base 7, the hinge 10, the power supply connector 13, the input connector 14, and the like which are arranged in the space 5 from being exposed, as shown in FIG. 1. A recess 19 is formed such that when the LCD panel 1 is rotated, the roof 17 does not interfere with the rotation.

Furthermore, the shape of the roof 17 is the shape of a concentric circle whose center is a rotation axis of the hinge 10. Even when the LCD panel 1 is also rotated as the movable portion 9 of the hinge 10 is rotated, the above-mentioned effect of preventing exposure is not lost while making it possible to smoothly rotate the LCD panel without being prevented its rotation by the roof 17. Further, an opening 18 is provided in the lower part of the cover 6. The power supply line 15 and the signal line 16 are led out of the space 5 through the opening 18, so that the aesthetic appearance of the power supply line 15 and the signal line 16 is improved, as shown in FIG. 1.

According to the present embodiment, the LCD panel 1 can be easily detached from the stand 2 by detaching the cover 6 and loosing the screw 12, and the size of the LCD panel 1 attached to the stand 2 is not limited. Therefore, the LCD panel 1 can be replaced with a desired LCD panel, regardless of basic liquid crystal characteristics (STN, TFT, etc.), the size (12 inches, 13 inches, etc.), and so forth.

Since the cover 6 is made detachable, the space 5 can be utilized as a space containing the lines 15 and 16.

Furthermore, the signal line 16 is connected to the LCD panel 1 in a vertical direction from below the space 5, as shown in FIG. 2, so that the depth of the overall image receiving monitor can be made smaller, as compared with that in a case where it is connected in a horizontal direction, thereby making it possible to save space.

As described in the foregoing, according to the present invention, it is possible to easily replace the LCD panel with a desired LCD panel, save space, and improve the aesthetic appearance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image receiving monitor using a liquid crystal display constructed by attaching a liquid crystal display panel to a stand, wherein
the stand comprises a pedestal, a surface plate in a semi-cylindrical shape provided on the pedestal, a cover attached to the surface plate so as to be detachable and constituting a space in an approximately cylindrical shape together with said surface plate when said cover is attached to the surface plate, and a hinge arranged in said space and having one end projecting outward from the space, and
said liquid crystal display panel is attached to the one end of said hinge so as to be detachable.

2. The image receiving monitor according to claim 1, wherein
a base is provided on the pedestal in said space, and
said hinge is provided on an upper part of the base.

3. An image receiving monitor using a liquid crystal display constructed by attaching a liquid crystal display panel to a stand, wherein
the stand comprises a pedestal, a surface plate in a semi-cylindrical shape provided on the pedestal, a cover attached to the surface plate so as to be detachable and constituting a space in an approximately cylindrical shape together with said surface plate when it is attached to the surface plate, and a hinge arranged in said space and having its one end protecting outward from the space, and
said liquid crystal display panel is attached to the one end of said hinge so as to be detachable; and wherein
said cover has a roof covering a part of the upper part of said space when it is attached to said surface plate, and
the roof is in the shape of a concentric circle whose center is a rotation axis of said hinge.

4. An image receiving monitor using a liquid crystal display constructed by attaching a liquid crystal display panel to a stand, wherein
the stand comprises a pedestal, a surface plate in a semi-cylindrical shape provided on the pedestal, a cover attached to the surface plate so as to be detachable and constituting a space in an approximately cylindrical shape together with said surface plate when it is attached to the surface plate, and a hinge arranged in said space and having its one end protecting outward from the space, and
said liquid crystal display panel is attached to the one end of said hinge so as to be detachable; and wherein
an opening is formed in the lower part of said cover.

5. An image receiving monitor using a liquid crystal display constructed by attaching a liquid crystal display panel to a stand, wherein
the stand comprises a pedestal, a surface plate in a semi-cylindrical shape provided on the pedestal, a cover attached to the surface plate so as to be detachable and constituting a space in an approximately cylindrical shape together with said surface plate when it is attached to the surface plate, and a hinge arranged in said space and having its one end projecting outward from the space, and
said liquid crystal display panel is attached to the one end of said hinge so as to be detachable; and wherein
a signal line for supplying a signal to the liquid crystal display panel is connected to said liquid crystal display panel in a vertical direction from below said space.

6. The image receiving monitor according to claim 2, wherein
said hinge comprises a fixed portion fixed to said base, a movable portion to which the liquid crystal display panel is attached, and a fastener for attaching the fixed portion and the movable portion so as to be rotatable.

7. An image receiving monitor using a liquid crystal display constructed by attaching a liquid crystal display panel to a stand, wherein
the stand comprises a pedestal, a surface plate in a semi-cylindrical shape provided on and integrally formed with the pedestal, a cover attached to the surface plate so as to be detachable and constituting a space in an approximately cylindrical shape together with said surface plate when it is attached to the surface plate, and a hinge arranged in said space and having one end projecting outward from the space, and said liquid crystal display panel is attached to the one end of said hinge so as to be detachable.

8. The image receiving monitor according to claim 7, wherein a base is provided on the pedestal in said space, and said hinge is provided on an upper part of the base.

9. The image receiving monitor according to claim 7, wherein said cover has a roof covering a part of an upper part of said space when said cover is attached to said surface plate, and the roof is in the shape of a concentric circle whose center is a rotation axis of said hinge.

10. The image receiving monitor according to claim 7, wherein an opening is formed in a lower part of said cover.

11. The image receiving monitor according to claim 7, wherein a signal line for supplying a signal to the liquid crystal display panel is connected to said liquid crystal display panel in a vertical direction from below said space.

12. The image receiving monitor according to claim 8, wherein said hinge comprises a fixed portion fixed to said base, a movable portion to which the liquid crystal display panel is attached, and a fastener for attaching the fixed portion and the movable portion so as to be rotatable.

\* \* \* \* \*